United States Patent
Gersht et al.

(10) Patent No.: US 11,327,723 B1
(45) Date of Patent: May 10, 2022

(54) DEVELOPMENT ENVIRONMENT INTEGRATED WITH FAILURE DETECTION SYSTEM

(71) Applicant: Red Hat, Inc., Raleigh, NC (US)

(72) Inventors: Ilan Gersht, Bat Yam (IL); Arie Bregman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/185,219

(22) Filed: Feb. 25, 2021

(51) Int. Cl.
*G06F 9/44* (2018.01)
*G06F 8/33* (2018.01)
*G06F 11/30* (2006.01)
*G06F 8/41* (2018.01)
*G06F 11/34* (2006.01)
*G06F 11/32* (2006.01)

(52) U.S. Cl.
CPC .............. *G06F 8/33* (2013.01); *G06F 8/41* (2013.01); *G06F 11/302* (2013.01); *G06F 11/323* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 9,804,950 B2 | 10/2017 | Bhogal et al. | |
| 9,928,156 B2 | 3/2018 | Perez Acosta et al. | |
| 10,565,093 B1 * | 2/2020 | Herrin | G06F 11/3664 |
| 10,802,951 B2 | 10/2020 | Falko | |
| 2016/0062745 A1 * | 3/2016 | Rao | G06F 8/33 |
| | | | 717/109 |
| 2016/0092502 A1 * | 3/2016 | Krishnamurthy | G06F 16/2428 |
| | | | 707/691 |
| 2017/0116109 A1 * | 4/2017 | Perez Acosta | G06F 11/3624 |
| 2017/0329579 A1 * | 11/2017 | Laethem | G06F 8/34 |
| 2020/0097390 A1 | 3/2020 | Gunter | |
| 2021/0182083 A1 * | 6/2021 | Pragya | G06F 11/323 |

FOREIGN PATENT DOCUMENTS

| | | |
|---|---|---|
| CN | 102880546 A | 6/2015 |
| FR | 3091374 A1 | 7/2020 |

OTHER PUBLICATIONS

Smartbear Software, "Build Stronger Code with the Fastest Developer Testing Tool", 2020, 5 pages.

* cited by examiner

*Primary Examiner* — Qamrun Nahar
(74) *Attorney, Agent, or Firm* — Lowenstein Sandler LLP (57) ABSTRACT

The technology disclosed herein enables performing code review during an active build. An example method may comprise causing, by a processor of an integrated development environment, execution of a software build job by a build tool, wherein the software build job comprises source code. The example method may further comprise tracking, using the integrated development environment, the execution of the software build job by receiving progress data associated with the execution. The example method may further comprise displaying, via a graphical user interface (GUI) of the integrated development environment, a plurality of lines of the source code. The example method may further comprise, responsive to detecting a failure during the execution, displaying, on the GUI, an information identifying the failure and a suggested corrective action.

18 Claims, 6 Drawing Sheets

DEVELOPMENT ENVIRONMENT INTEGRATED WITH FAILURE DETECTION SYSTEM

TECHNICAL FIELD

The present disclosure is generally related to development environment integration, and more particularly, to integrating a failure detection system with a development environment.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed at periodic times, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

Described herein are systems and methods for integrating an error detection system with a development environment. A development environment, such as a text editor or an Integrated Development Environment (IDE), may be used to develop (e.g., create, test, and change) computer program code in a programming language. The program code may be in the form of source code stored in files that are processed by the interpreters or compilers of, for example, continuous software integration tools.

Continuous software integration tools, referred to herein as "build tools," may perform build processes to generate software images from source code and other data. Software images may be, for example, executable code of software application programs. Source code may include instructions in a programming language that may be translated to executable code. The translation from source code to executable code may be performed by compiler programs. Other data may also be processed, e.g., transformed to suitable formats, and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built. A particular set of instructions specifying how to perform a particular build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which are may be executed sequentially in an active build. A job may thus be referred to as a "pipeline" of one or more stages. The stages may include, for example, compile, test, and deploy stages. The compile stage may translate source code to executable code, the test stage may perform tests to verify that the executable code operates correctly, and the deploy stage may install the executable code on host machines, for example. A build may execute for a substantial period of time (e.g., several minutes to several hours or days).

In some instances, the build process may fail due to various errors (e.g., syntax errors, logic errors, compilation errors, runtime errors, and so on). Responsive to the failure, a user would need to inspect the source code to determine the location responsible for the failure (e.g., which line of code contains a programming error). Next, the user would need to determine the context of the failure (e.g., what type of programming error, how to fix the programming error, etc.). However, manually performing failure detection and correction is a time-consuming and difficult process. In some instances, the user may use a code review system to aid in locating the failure. However, existing code review systems are separate from development environments, and using code review systems with development environments is cumbersome and also time-consuming. For example, a development environment, in which a user creates and modifies source code using a text editor, ordinarily has a separate user interface from the code review system. Thus, the user may need to switch their attention back and forth between the development environment and the code review system repeatedly to revise the code. Switching between user interfaces interrupts the user's work and ordinarily involves switching to a user interface that interacts with the user differently from the code review system, which can interrupt the user's concentration. Accordingly, it is desirable to provide an integrated user interface capable of displaying to the user, in real-time, the execution of the active build, and providing failure detection data along with correction suggestions.

Aspects of the present disclosure address the above-noted and other deficiencies by enhancing a build system with a failure detection system. The failure detection system is capable of displaying, in real time, output produced by the execution of an active build, as well as providing the user with failure detection data and correction suggestions. In an illustrative example, a development environment may execute a job on a build tool. During execution, the development environment may track the active build and display, to the user, which stage of the pipeline is executing, which line of the source code is being executed, whether a programming error occurred, whether a test integration failure occurred, and other details relating to the execution of the source code. A programming error can include syntax error, a logic error, a compilation error, a runtime error, etc. A test integration failure may include a deviation from the results specified by a test script despite a clean build (no build errors) and a clean execution of the build (no runtime errors). The development environment may further display a viewing area showing a section of lines of code of the source code and indicating which line of code from the displayed section is being executed. For example, the line of code that is being executed by the build tool may be highlighted or pointed to. The development environment may further generate a failure report that includes each failure that occurred, the location of each failure (e.g., which line of code, in which stage, etc.), the type of failure that occurred (e.g., type of programming error, error other than a programming error, etc.), and a suggested corrective action for each failure. The correction data may include a proposed solution to fix source code responsible for causing the failure.

Various aspects of the above referenced methods and systems are described in details herein below by way of examples, rather than by way of limitation. The examples provided below discuss a code review system that integrates a development environment with a code review component. In other examples, the methods and systems described herein may be performed by any suitable component that interacts with the development environment and the code review system.

Figure 1:
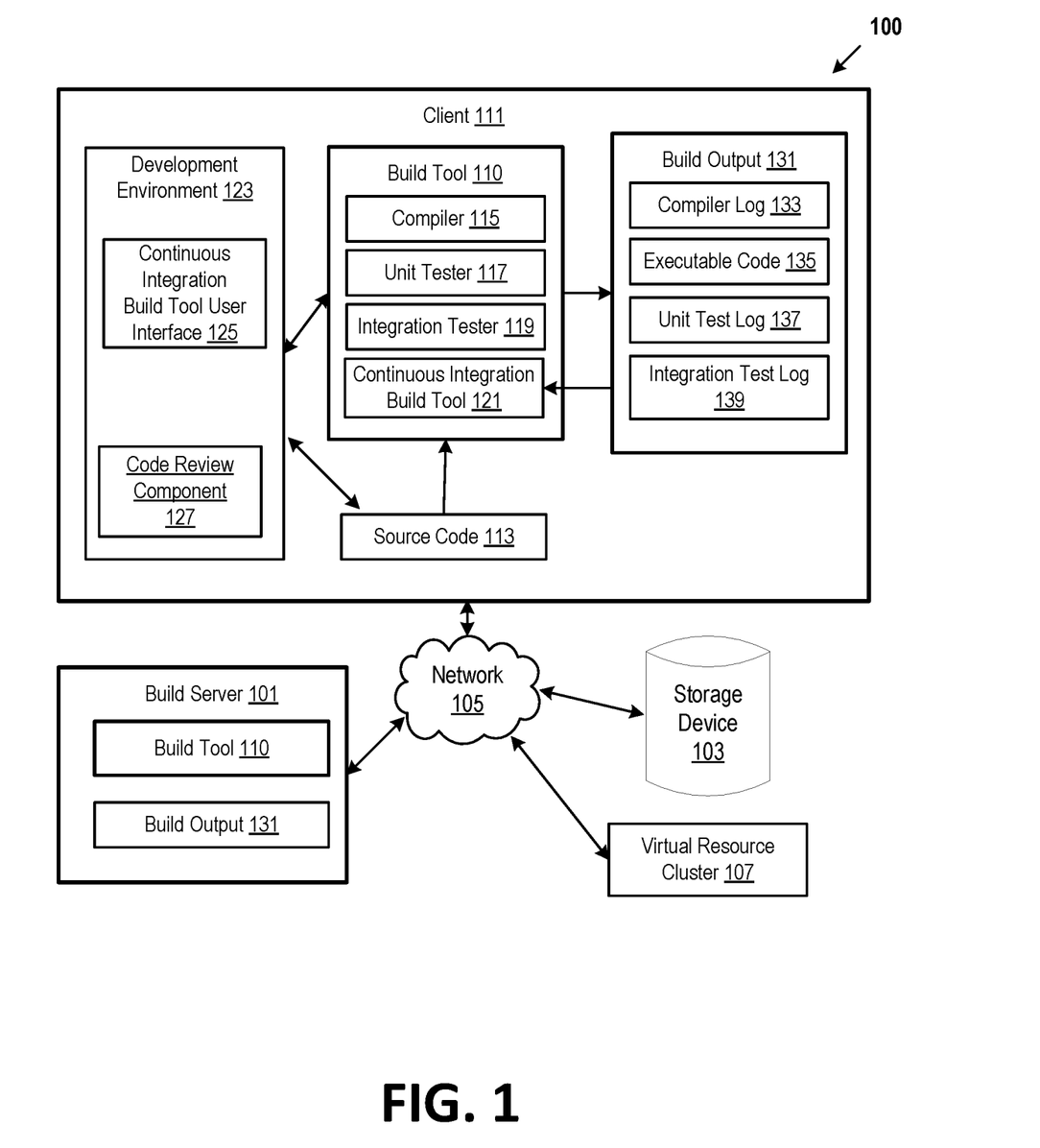
FIG. 1 depicts a high-level block diagram of an example computing environment that includes a continuous integration build tool user interface, in accordance with one or more aspects of the present disclosure.

FIG. 1 depicts a high-level block diagram of an example computing environment 100 that includes a continuous integration build tool user interface 125, in accordance with one or more aspects of the present disclosure. The computing environment 100 may provide build management services that include executing build operations to perform builds of source code 113 to produce build output 131. The builds may be performed in accordance with instructions provided by the continuous integration build tool user interface 125. In some embodiments, the computing environment 100 may include one or more build servers 101 for running the sets of operations for providing builds in a continuous integration environment. The builds may be for source code 113, e.g., of an application that is being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build server(s) 101 may be hosted on any type of computing node, which may be a virtualized or bare metal computing device such as a server computer, a desktop computer, a portable computing device such as, and not limited to, netbooks, laptop computers, and the like.

Build tool 110 may be located on client 111, on build server 101, or both. Build tool 110 may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds. A software build job (e.g., a pipeline of one or more stages) can be executed by build tool 110.

Users, such as computer program development team members, may use a development environment 123 to submit source code 113 to build tool 110 located on client 111 and/or build tool 110 located on build server 101. Users may submit source code to build tool 110 located on the build server 101 from client 111 via network 105. Build tool 110 or other tools (e.g., a version control tool) may merge the submitted source code 113 with a shared mainline code base that is being stored and maintained by build server 101. Users may submit source code 113 to any of the build tools 110 on a daily (or more frequent) basis, and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110 may include a compiler 115 to compile computer source code 113 into executable code 135, and to generate other build output 131, such as a compiler log 133 that contains output describing progress and results of the compilation process. Build tool 110 may include a unit tester 117 and an integration tester 119 for running automated tests on artifacts (e.g., tangible by-products produced during software development). Unit tester 117 may test that the individual functions in the source code 113 or executable code 135 work properly and generate unit test log 137 that contains output(s) describing progress and results of the unit tester 117. Integration tester 119 may test the executable code 135 in an environment in which the executable code 135 is expected to be executed by users. Build tool 110 may include continuous integration build tool 121 for performing continuous build operations (e.g., performing a build at periodic intervals or in response to user requests), and presenting information about the status of executing builds and the results of completed builds. Continuous integration build tool 121 may start builds, e.g., by executing compiler 115, unit tester 117, and integration tester 119 in accordance with a build configuration script that contains instructions for compiling the source code and testing the resulting executable code 135. Continuous integration build tool 121 may monitor build output 131 and display progress information, such as the stage of the build (e.g., compiling, unit testing, or integration testing), the status of an executing build (e.g., how many files have been compiled, how many tests have passed, and how many tests have failed). Continuous integration build tool 121 may detect the completion of a build by receiving a result value from compiler 115, unit tester 117, and integration tester 119, or by detecting particular text in the build output logs, for example. Continuous integration build tool 121 may generate an integration test log 139 containing information describing the progress of the operations performed by the continuous integration build tool 121.

Integration tester 119 may create virtual resource cluster 107 for the integration testing of the artifacts. The virtual resources in cluster 107 may be containers, virtual machines, container(s) within a virtual machine, and/or virtual machine (s) running within a container. A container may refer to an isolated set of resources allocated to executing an application and/or process independent from other applications and/or processes. A virtual machine may be an emulated computer system, created using software that includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101 and/or client 111. In another example, virtual resource cluster 107 may include one or more other computing machines not shown by FIG. 1. The computing machines may be server computer systems, desktop computers or any other computing devices.

A host machine may allocate a certain amount of its computing resources (e.g., processor resources (CPU resources), physical or virtual memory, input/output (I/O) resources, network resources, etc.) to individual virtual resources (e.g., virtual machine, container), and may multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor may emulate the underlying hardware (e.g., infrastructure) of the host machine, making use of the virtual machine. Accordingly, build tool 110 (or build server 101 and/or client 111) may be allotted a different set of computing resources.

An application being deployed in a container may run under the host operating system. The host machine for the container may include a container engine to create and manage the containers. In one implementation, a container may run on a virtual machine to provide an extra layer of separation between applications running on a guest operating system of the virtual machine. In one implementation a virtual machine may run on a container to maintain isolation and security properties of virtual machines while being able to package and distribute computer programs as a container.

Integration tester 119 may run the executable code 135 in virtual resource cluster 107, and run integration tests against the distributed system being provided by virtual resource cluster 107. After build tool 110 compiles the source code 113 and runs unit tests and integration tests, build tool 110 may report whether the attempt to provide the build was a success or includes a failure. A failure may be caused by the compiling of the source code failing, unit testing failing, and/or integration testing failing.

Development environment 123 may include continuous integration build tool user interface 125 and code review component 127. Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110 can execute to perform builds. Instructions can be provided to build tools 110 in the form of build files, such as build scripts or declarative descriptions of the files to be built in terms of files from which they are built. A job can be executed by build tool 110. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Code review component 127 may track the executing job and display, to the user, real-time progress data. The progress data may include which stage of the pipeline (e.g., the compile stage, the test stage, the deploy stage, etc.) is executing, which line of the source code is being executed, whether a programming error (e.g., syntax error, logic error, compilation error, runtime error) occurred, and so forth. Code review component 127 may further enable continuous integration build tool user interface 125 to display the progress data to the user. For example, continuous integration build tool user interface 125 may display a viewing area showing a section of lines of code of the source code and indicating which line of code from the displayed section is being executed. Code review component 127 may further generate a failure report. The failure report may include each failure that occurred, the location of each failure (e.g., which line of code, in which stage, etc.), the type of failure that occurred (e.g., type of programming error, etc.), and corrective action for each failure. Code review component 127 will be discussed in detail in FIG. 2.

Figure 2:
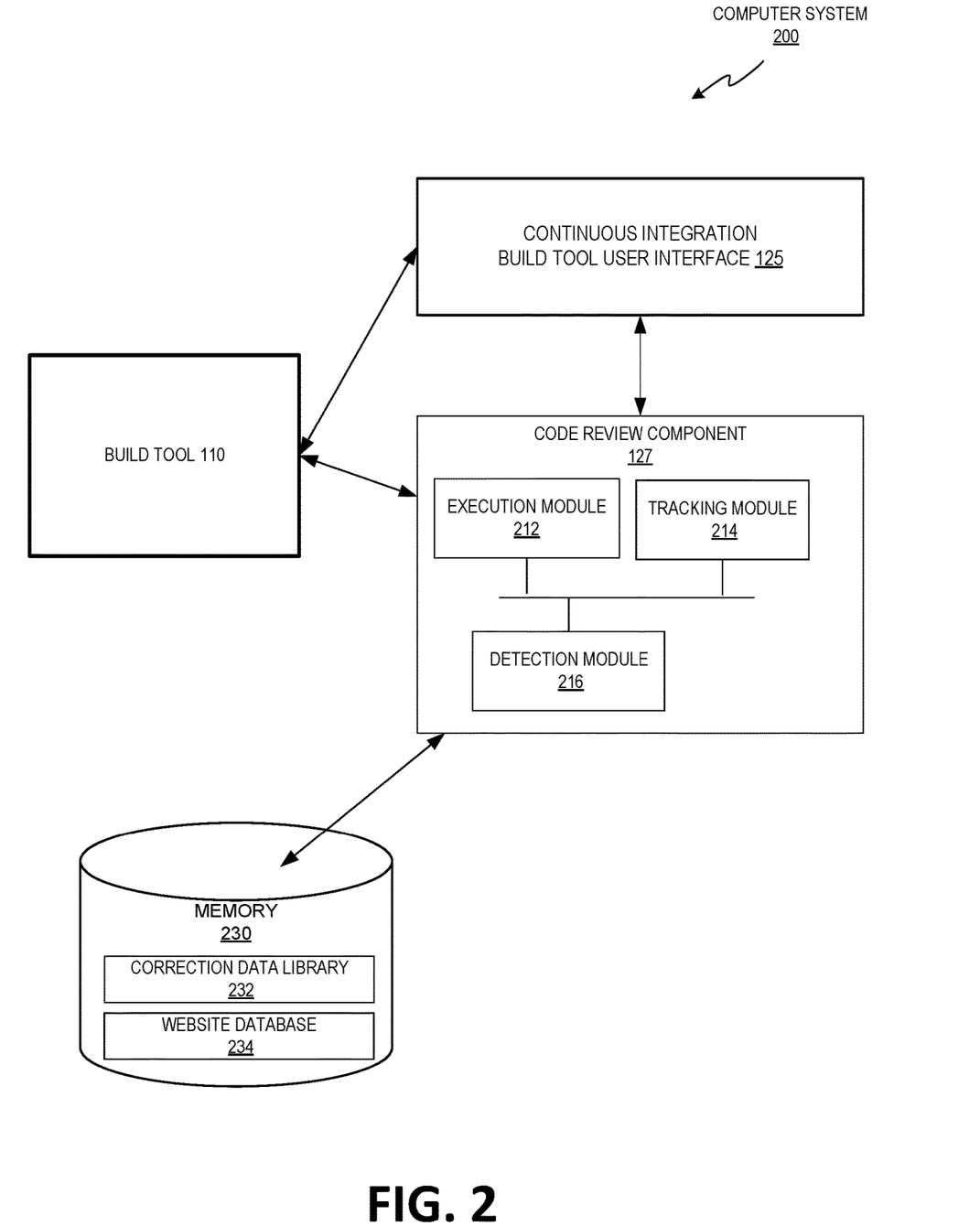
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In the example shown, computer system 200 may include code review component 127, build tool 110, continuous integration build tool user interface 125, and memory 230. Code review component 127 may run executable code that implements one or more of the components and modules and may be implemented within a host operating system, a hypervisor, a guest operating system, a container, hardware firmware, or a combination thereof. Code review component 127 may include execution module 212, tracking module 214, and detection module 216. Memory 230 may include library 232 and website database 234.

Execution module 212 may initiate execution of a new job on build tool 110. In some embodiments, execution module 214 may receive an indication from a client (e.g., client 111)

to execute a job (i.e., a particular set of instructions specifying how to perform a particular build process). In some embodiments, execution module 216 may select the next available job from job queue 234. In some embodiments, the new job may be in a waiting state in a build queue awaiting a free computing node (e.g., build server 101).

During execution of the job, the build tool 110 may perform a build process to generate executable code of software application programs from the source code. The source code may include instructions in a programming language that may be translated to the executable code. The build process may cause the appropriate source code to be translated to executable code and included in the resulting software application programs. The job may include a set of stages, which are may be executed sequentially in the active build (e.g., a "pipeline" of one or more stages). The stages may include, for example, compile, test, and deploy stages. The compile stage may translate source code to executable code, the test stage may perform tests to verify that the executable code operates correctly, and the deploy stage may install the executable code on one or more host machines.

Tracking module 214 may track the executing job and display, to the user, real-time progress data. In particular, tracking module 214 may communicate with build tool 110 to retrieve and/or receive progress data. The progress data may include which stage of the pipeline (e.g., the compile stage, the test stage, the deploy stage, etc.) is executing, which line of the source code is being executed, whether a programming error (e.g., syntax error, logic error, compilation error, runtime error) occurred, and so forth. In some embodiments, tracking module 214 may communicate with build tool 110 via a program capable of handling periodic requests for data, such as a daemon.

In some embodiments, tracking module 214 may read one or more logs generated by build tool 110 to retrieve the progress data. For example, build tool 110 may generate a pipeline log describing the progress of the operations performed by build tool 110. For example, the pipeline log may include data from the compiler log, the build output log, the unit test log, the integration test log, task failures, diagnostics data, etc. The pipeline log may be generated in a file format, such as, for example, JSON (JavaScript Object Notation), XML (Extensible Markup Language), and so forth. Tracking module 214 may retrieve and/or receive the pipeline log and extract progress data from the pipeline log.

In yet another example, tracking module 214 may listen to network traffic generated by build tool 110 to obtain the progress data. For example, tracking module 214 may capture data packets transmitted or received by build tool 110 using, for example, a packet sniffer, a filter, etc.

Tracking module 214 may further enable a graphic user interface (GUI), such as continuous integration build tool user interface 125, to display the progress data to the user. For example, the GUI may display a viewing area (e.g., a window) showing a section of lines of code of the source code. A single line of code, from the displayed section, that is being executed by build tool 110 may be identified (e.g., highlighted, pointed to, etc.) by the GUI. Once the identified code line is executed, the next code line can be identified to indicate that it is being executed by build tool 110. In some embodiments, the GUI may identify which lines of code have been successfully executed, which lines of code failed to executed, which lines of code have yet to be executed, which line of code cannot be executed (e.g., due to a failure in a difference line of code), etc. For example, lines of code have been successfully executed may highlighted in a first color, lines of code that failed to execute may be highlighted in a second color, lines of code that have yet to be executed may be highlighted in a third color, and so on. In some embodiments, the user can scroll through the viewing area to view each line of the source code executed, executing, scheduled to be executed, or failed to execute by build tool 110.

Detection module 216 may detect failures that occurred during the execution of the job on build tool 110. A failure may be any compiling, testing, or deploying issue that occurred during execution of the active build due to, for example, a programming error. In some embodiments, detection module 216 may detect one or more failure by reading and extracting failure data from the pipeline log. The failure data may further indicate the type of failure that occurred (e.g., type of programming error, such as a syntax error, a logic error, a compilation error, a runtime error, a test integration failure, etc.). In some embodiments, detection module 216 may detect one or more failures by communicating with build tool 110 via a program capable of handling periodic requests for data (e.g., a daemon), which may also indicate the type of error that occurred. In some embodiments, detection module 216 may detect one or more failures and determine the type of failure that occurred by listening to network traffic generated by build tool 110 by, for example, capturing data packets transmitted or received by build tool 110 using a packet sniffer, a filter, or the like. In some embodiments, the failures may be reviewed by a user, and tagged with type of failure data (e.g., the user determines the type of failure that occurred, and records it).

In some embodiments, detection module 216 may generate a failure report. The failure report may include each failure that occurred, the location of each failure (e.g., which line of code, in which stage, etc.), the type of failure that occurred, and a corrective action for each failure. A corrective action may include a proposed solution to fix (e.g., edit) the line(s) of source code responsible for causing the failure. The corrective action may further include a metric indicating the probability that the proposed solution will fix the failure. By way of illustrative example, a failure may occur due to a line of source code (e.g., line 42) exceeding an allowable character limit (e.g., 80 characters). Accordingly, the failure report may display to the user that a source code failure occurred at line 42 because the line is longer than 80 characters. Further, the failure report may indicate to the user to shorten line 42 to 80 characters or fewer.

Detection module 216 may determine a corrective action for each failure detected. In one example, detection module 216 may retrieve the corrective action from correction data library 232 (hereafter "library 232"). In particular, library 232 can store data associated with previous code corrections. For example, a user can experience a failure in a line of code, determine the cause of the failure, and correct the line of code. Detection module 216 may store corrective action associated with the correction in library 232. The corrective action may be tagged with one or more parameters such as failure message type, code error type, syntax parameters, logic parameters, other code line(s) detected in the source code, programming language used, etc. Corrective actions submitted from one or more users of computing environment 100 can be used to expand library 232, thus constantly revising, growing and adapting library 232 to new issues and changes. Thus, in response to detecting a failure, detection module 216 may query library 232 for parameters matching the detected failure. For example, using the illustrative example above, in response to a failure occurring due to a line of source code exceeding an allowable character limit, detection module 216 may query library 232 for excessive characters failure, and retrieve the associated (e.g., tagged) corrective action (indicating to the user to the line the error occurred on to the allowable character limit).

In some embodiments, in response to detecting a failure, detection module 216 can query one or more external publically available information sources (e.g., a website, a database, an archive, etc.) via network 105. For example, detection module 216 can retrieve one or more websites from website database 234, and search for parameters matching or similar to those in the detected failure. The website may include message boards, tutorials, etc. In response to a predetermine amount of parameters matching data on a webpage on a web site, detection module 216 may send said webpage to the user as a possible solution to the failure.

In some embodiments, detection module 216 may generate a probability metric, for each located solution, indicating the likelihood of the proposed solution correcting the failure. In some embodiments, the metric may reflect the relevance of a webpage to the failure to be addressed (e.g., based on the ratio of the percentage of parameters matching data on the webpage). For example, detection module 216 may determine that a question on a forum discusses a failure message indicating that a code line exceeds a character limit in C++ based source code. As such, detection module 216 can determine that two parameters (e.g., code error type and logic parameters) related to a detected failure of build tool 110, while one other parameter (programming language used) is different or undetected in the webpage. In response, detection module 216 may generate a probability metric indicating that the discovered webpage has a 66% likelihood of the containing a solution for correcting the failure. Detection module 216 can then include the webpage and the probability metric in the failure report and send the failure report to the GUI for display.

The user may use the failure report to submit the corrections to the source code. The user may then resubmit the job for execution by build module 110. Accordingly, execution module 212 may initiate execution of a corrected job on build tool 110.

Figure 3:
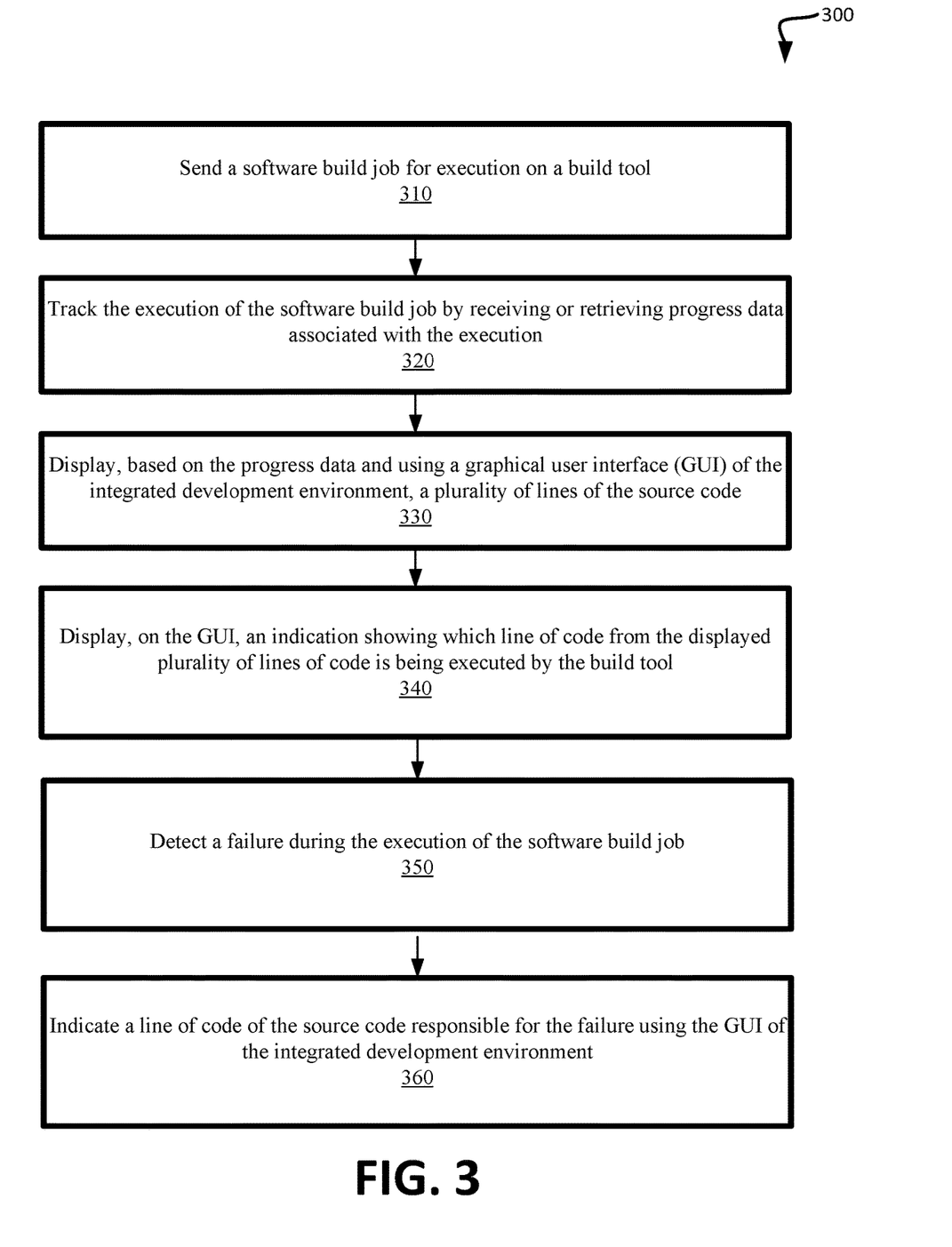
FIG. 3 depicts a flow diagram of an example method for performing code review during an active build, in accordance with one or more aspects of the present disclosure.

FIG. 3 depicts a flow diagram of an example method 300 for performing code review during an active build, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a client device and may begin at block 310. At block 310, an integrated development environment operating on a computer device may send a software build job for execution on a build tool. The software build job may include source code.

At block 320, the computer device may track, using the integrated development environment, the execution of the software build job by receiving or retrieving progress data associated with the execution. In some embodiments, the computer device may extract the progress data from a pipeline log.

At block 330, the computer device may display, based on the progress data and on a GUI of the integrated development environment, one or more lines of the source code.

At block 340, the computer device may display an indication showing which line of code from the displayed plurality of lines of code is being executed by the build tool. In some embodiments, the computer device can display, on the GUI, an indication showing which one or more lines of code have been successfully executed, have yet to be executed, or cannot be executed.

At block 350, the computer device may detect a failure during the execution of the software build job. The failure may include a programming error in a line of code.

At block 360, the computer device may indicate a line of code of the source code responsible for the failure. In some embodiments, the computer device may indicate a type of programming error that caused the failure. The programming error may include at least one of a syntax error, a logic error, a compilation error, or a runtime error. In some embodiments, the computer device may determine a solution to correct the failure in view of correction data. The corrective action may be obtained from a correction data library and/or a website database. In some embodiments, the computer device may determine a probability metric indicating the likelihood of the solution correcting the failure. Responsive to completing the operations described herein above with references to block 360, the method may terminate.

Figure 4:
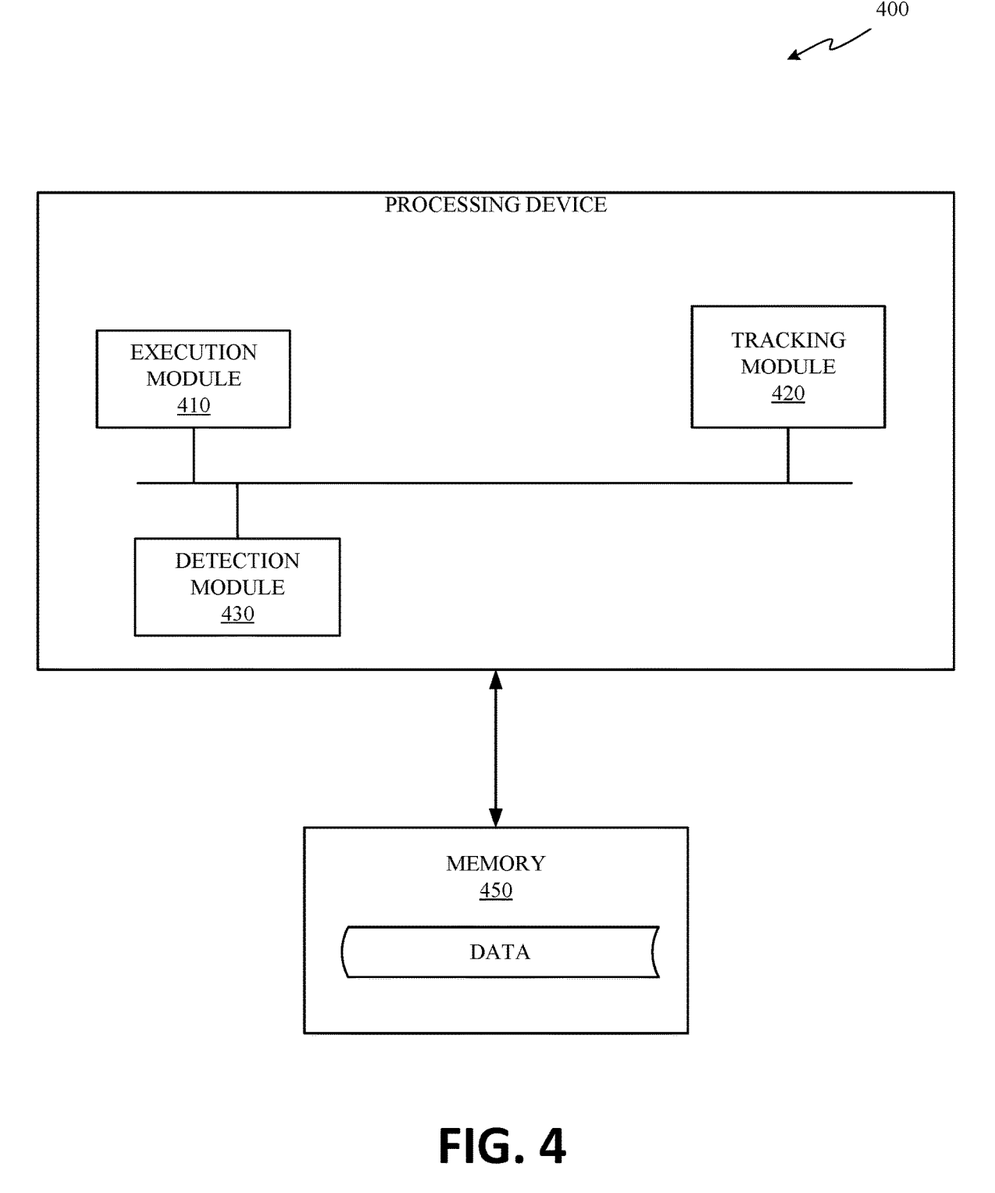
FIG. 4 depicts a block diagram of a computer system operating in accordance with one or more aspects of the present disclosure.

FIG. 4 depicts a block diagram of a computer system 400 operating in accordance with one or more aspects of the present disclosure. One or more of the components of FIG. 1 may execute on computer system 400. Computer system 400 may be the same or similar to client 111 of FIG. 1, and may include one or more processors and one or more memory devices. In the example shown, computer system 400 may include execution module 410, tracking module 420, detection module 430, and memory 450.

Execution module 410 may send a software build job for execution on a build tool. The software build job may include source code.

Tracking module 420 may track the execution of the software build job by receiving or retrieving progress data associated with the execution. In some embodiments, tracking module 420 may extract the progress data from a pipeline log. Tracking module 420 may display, based on the progress data and on a GUI of an integrated development environment, one or more lines of the source code. Tracking module 420 may further display an indication showing which line of code from the displayed plurality of lines of code is being executed by the build tool. In some embodiments, the tracking module 420 can display, on the GUI, an indication showing which one or more lines of code have been successfully executed, have yet to be executed, or cannot be executed.

Detection module 430 may detect a failure during the execution of the software build job. The failure may include a programming error in a line of code. Detection module 430 may indicate a line of code of the source code responsible for the failure. In some embodiments, detection module 430 may indicate a type of programming error that caused the failure. The programming error may include at least one of a syntax error, a logic error, a compilation error, or a runtime error. In some embodiments, detection module 430 may determine a solution to correct the failure in view of correction data. The correction data may be obtained from a correction data library and/or a website database located on memory 450. In some embodiments, detection module 430 may determine a probability metric indicating the likelihood of the solution correcting the failure.

Figure 5:
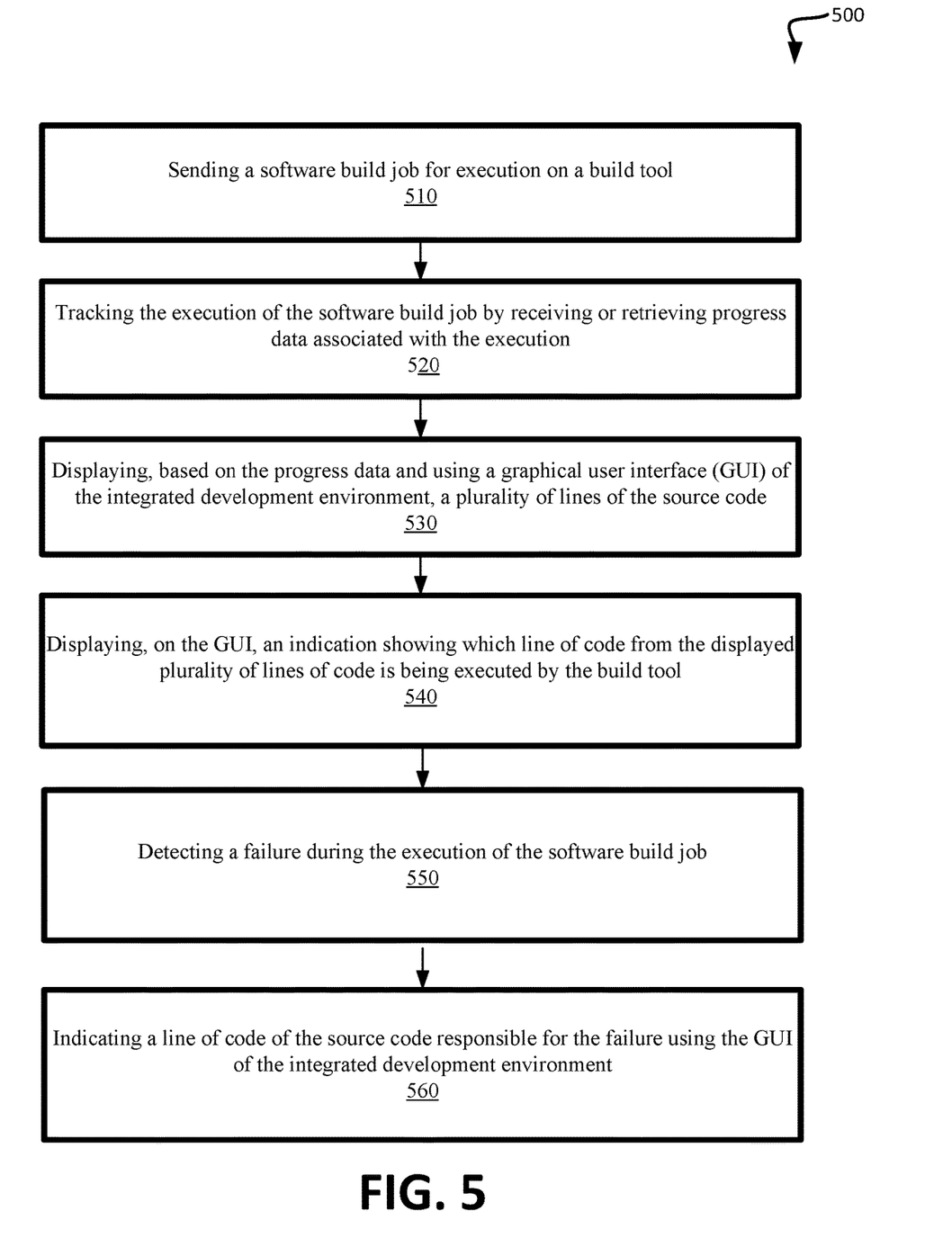
FIG. 5 depicts a flow diagram of another example method for performing code review during an active build, in accordance with one or more aspects of the present disclosure.

FIG. 5 depicts a flow diagram of one illustrative example of a method 500 for performing code review during an active build, in accordance with one or more aspects of the present disclosure. Method 500 may be similar to method 500 and may be performed in the same or a similar manner as described above in regards to method 500.

Method 500 may be performed by processing devices of a server device or a client device and may begin at block 510. At block 510, a processing device may send a software build job for execution on a build tool. The software build job may include source code.

At block 520, the processing device may track, using the integrated development environment, the execution of the software build job by receiving or retrieving progress data associated with the execution. In some embodiments, the processing device may extract the progress data from a pipeline log.

At block 530, the processing device may display, based on the progress data and on a GUI of the integrated development environment, one or more lines of the source code.

At block 540, the processing device may display an indication showing which line of code from the displayed plurality of lines of code is being executed by the build tool. In some embodiments, the processing device can display, on the GUI, an indication showing which one or more lines of code have been successfully executed, have yet to be executed, or cannot be executed.

At block 550, the processing device may detect a failure during the execution of the software build job. The failure may include a programming error in a line of code.

At block 560, the processing device may indicate a line of code of the source code responsible for the failure. In some embodiments, the processing device may indicate a type of programming error that caused the failure. The programming error may include at least one of a syntax error, a logic error, a compilation error, or a runtime error. In some embodiments, the processing device may determine a solution to correct the failure in view of correction data. The correction data may be obtained from a correction data library and/or a website database. In some embodiments, the computer device may determine a probability metric indicating the likelihood of the solution correcting the failure. Responsive to completing the operations described herein above with references to block 560, the method may terminate.

Figure 6:
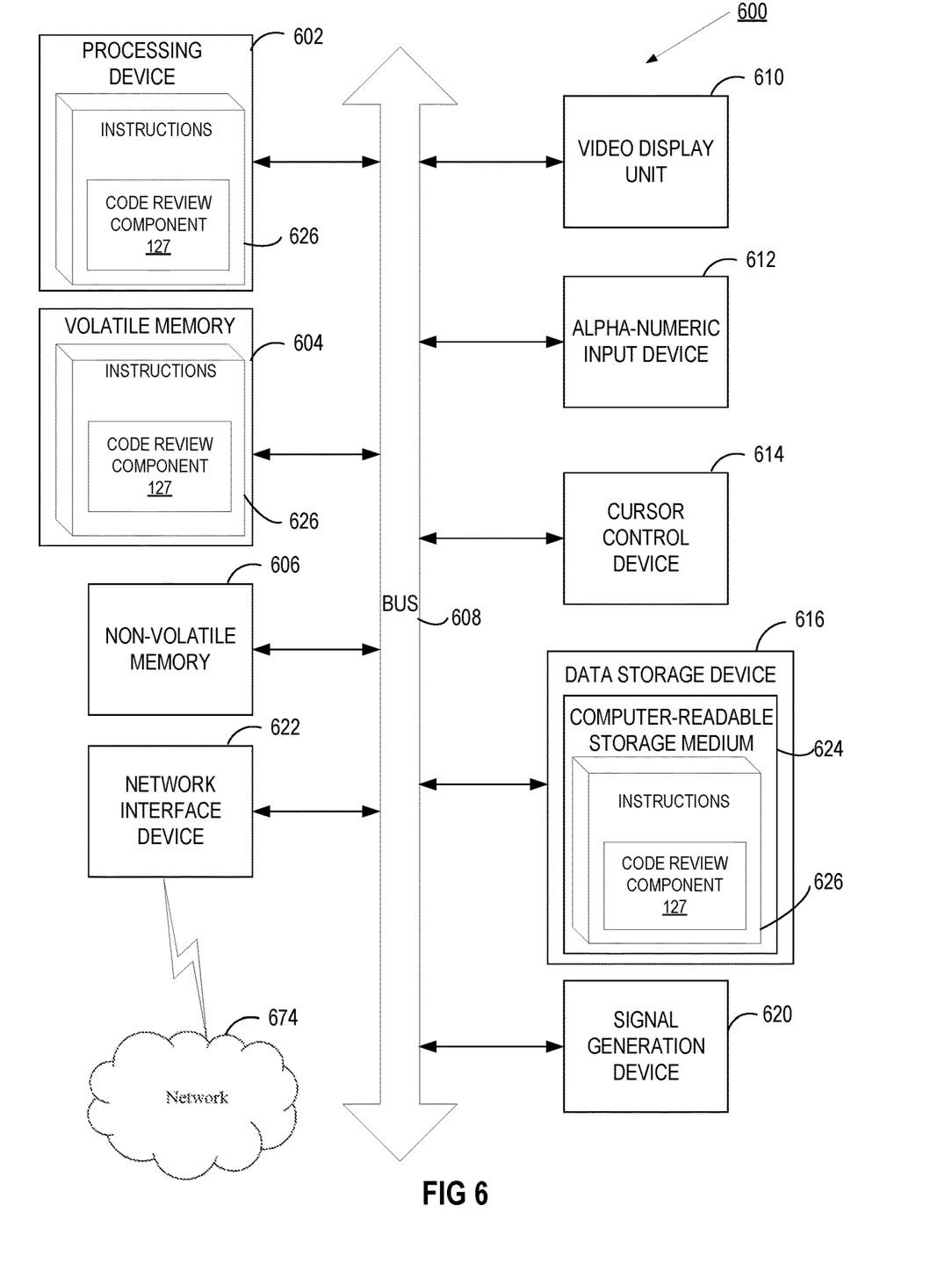
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   causing, by a processor of an integrated development environment, execution of a software build job by a build tool, wherein the software build job comprises source code;
   tracking, using the integrated development environment, the execution of the software build job by receiving progress data associated with the execution;
   displaying, via a graphical user interface (GUI) of the integrated development environment, a plurality of lines of the source code;
   responsive to detecting a failure during the execution, displaying, on the GUI, an information identifying the failure and a suggested corrective action; and
   determining a probability metric indicating a likelihood of the suggested corrective action correcting the failure.

2. The method of claim 1, wherein detecting the failure comprises:
   communicating with the build tool via a program capable of handling periodic requests for data.

3. The method of claim 1, wherein detecting the failure comprises:
   listening to network traffic generated by the build tool.

4. The method of claim 1, wherein detecting the failure comprises:
   extracting failure data from a pipeline log.

5. The method of claim 1, wherein the information identifying the failure comprises:
   a type of programming error that caused the failure, wherein the programming error includes at least one of a syntax error, a logic error, a compilation error, or a runtime error.

6. The method of claim 1, further comprising:
   generating the suggested corrective action by retrieving the corrective action from a correction data library.

7. The method of claim 1, further comprising:
   generating the suggested corrective action by retrieving the corrective action from an external publically available information source.

8. A system comprising:
   a memory;
   a processing device operatively coupled to the memory, the processing device configured to:
      cause execution of a software build job by a build tool, wherein the software build job comprises source code;
      track, using an integrated development environment, the execution of the software build job by receiving progress data associated with the execution;
      display, via a graphical user interface (GUI) of the integrated development environment, a plurality of lines of the source code;

responsive to detecting a failure during the execution, display, on the GUI, an information identifying the failure and a suggested corrective action; and
determining a probability metric indicating a likelihood of the suggested corrective action correcting the failure.

9. The system of claim 8, wherein detecting the failure comprises the processing device being configured to:
communicate with the build tool via a program capable of handling periodic requests for data.

10. The system of claim 8, wherein detecting the failure comprises the processing device being configured to:
listen to network traffic generated by the build tool.

11. The system of claim 8, wherein detecting the failure comprises the processing device being configured to:
extract failure data from a pipeline log.

12. The system of claim 8, wherein the information identifying the failure comprises:
a type of programming error that caused the failure, wherein the programming error includes at least one of a syntax error, a logic error, a compilation error, or a runtime error.

13. The system of claim 8, wherein the processing device is further configured to:
generate the suggested corrective action by retrieving the corrective action from a correction data library.

14. The system of claim 8, wherein the processing device is further configured to:
generate the suggested corrective action by retrieving the corrective action from an external publically available information source.

15. A non-transitory machine-readable storage medium storing executable instructions that, when executed by a processing device, cause the processing device to:
cause execution of a software build job by a build tool, wherein the software build job comprises source code;
track, using an integrated development environment, the execution of the software build job by receiving progress data associated with the execution;
display, via a graphical user interface (GUI) of the integrated development environment, a plurality of lines of the source code;
responsive to detecting a failure during the execution, display, on the GUI, an information identifying the failure and a suggested corrective action; and
determining a probability metric indicating a likelihood of the suggested corrective action correcting the failure.

16. The non-transitory machine-readable storage medium of claim 15, wherein detecting the failure comprises executable instructions that, when executed by the processing device, cause the processing device to at least one of communicate with the build tool via a program capable of handling periodic requests for data, listen to network traffic generated by the build tool, or extract failure data from a pipeline log.

17. The non-transitory machine-readable storage medium of claim 15, wherein the information identifying the failure comprises:
a type of programming error that caused the failure, wherein the programming error includes at least one of a syntax error, a logic error, a compilation error, or a runtime error.

18. The non-transitory machine-readable storage medium of claim 15, further comprising executable instructions that, when executed by the processing device, cause the processing device to:
generate the suggested corrective action by at least one of retrieving the corrective action from a correction data library or retrieving the corrective action from an external publically available information source.

* * * * *